(12) United States Patent
Hwang

(10) Patent No.: US 11,946,236 B2
(45) Date of Patent: Apr. 2, 2024

(54) DRAIN TRAP ASSEMBLY

(71) Applicant: IB KOREA CO., LTD., Chuncheon-si (KR)

(72) Inventor: Geum Jin Hwang, Anyang-si (KR)

(73) Assignee: IB KOREA CO., LTD., Chuncheon-si (KR)

( * ) Notice: Subject to any disclaimer, the term of this patent is extended or adjusted under 35 U.S.C. 154(b) by 336 days.

(21) Appl. No.: 17/607,432

(22) PCT Filed: May 23, 2019

(86) PCT No.: PCT/KR2019/006162
§ 371 (c)(1),
(2) Date: Jun. 7, 2022

(87) PCT Pub. No.: WO2020/222348
PCT Pub. Date: Nov. 5, 2020

(65) Prior Publication Data

US 2022/0325512 A1    Oct. 13, 2022

(30) Foreign Application Priority Data

May 2, 2019  (KR) .................. 10-2019-0051800

(51) Int. Cl.
*E03C 1/29* (2006.01)
*E03C 1/14* (2006.01)
*F16L 37/091* (2006.01)
*F16L 37/12* (2006.01)

(52) U.S. Cl.
CPC .............. *E03C 1/29* (2013.01); *E03C 1/14* (2013.01); *F16L 37/091* (2013.01); *F16L 37/12* (2013.01); *Y10T 137/9138* (2015.04)

(58) Field of Classification Search
CPC ..... E03C 1/29; E03C 1/14; E03C 1/04; E03C 1/02; F16L 37/091; F16L 37/12; F16L 37/08; Y10T 137/9029; Y10T 137/9138
USPC .................................................. 137/798–799
See application file for complete search history.

(56) References Cited

U.S. PATENT DOCUMENTS

| 5,683,117 A * | 11/1997 | Corbett | F16L 37/0885 |
| | | | 285/305 |
| 5,913,325 A * | 6/1999 | Helmsderfer | F16L 59/18 |
| | | | 285/47 |
| 9,677,699 B2 | 6/2017 | Barthel et al. | |
| 2011/0073205 A1 * | 3/2011 | Marty | E03C 1/0403 |
| | | | 137/801 |

(Continued)

FOREIGN PATENT DOCUMENTS

| CN | 202139663 U | * | 2/2012 |
| FR | 3026814 | | 4/2016 |
| JP | 2014214876 | | 11/2014 |

(Continued)

OTHER PUBLICATIONS

Office Action from the China National Intellectual Property Administration dated Jun. 2, 2023.
International Search Report for PCT/KR2019/006162.

*Primary Examiner* — John Bastianelli

(57) ABSTRACT

A drain trap assembly for sanitary appliances allows a worker to conveniently and swiftly perform assembly for installation and disassembly for maintenance and repair, without use of a separate tool, since a drain trap has a one-touch connection with an inlet pipe and/or an outlet pipe.

3 Claims, 13 Drawing Sheets

(56) References Cited

U.S. PATENT DOCUMENTS

2014/0261747 A1   9/2014  Bares et al.

FOREIGN PATENT DOCUMENTS

| KR | 2013-0030614 | 3/2013 |
| KR | 2020140005991 | 12/2014 |
| KR | 101843321 | 3/2018 |
| KR | 1020190014835 | 2/2019 |

* cited by examiner

DRAIN TRAP ASSEMBLY

TECHNICAL FIELD

Embodiments of the present disclosure relate to a drain trap assembly configured to guide water discharged from a sanitary appliance, such as a washbasin, a urinal receptacle, a bath, and a sink, to a sewer pipe.

BACKGROUND ART

In general, a sanitary appliance such as a washbasin is provided with a drain outlet, and a drain guide device for guiding water discharged through the drain outlet to a sewer pipe is connected to the drain outlet of the sanitary appliance.

Each of Korean Patent Application Publication No. 10-2009-0037513 (Apr. 16, 2009), Korean Patent No. 10-1734203 (May 17, 2017), and Korean Patent No. 10-1843321 (Mar. 28, 2018) discloses a drain guide device for a sanitary appliance according to the related art.

The drain guide device for a sanitary appliance according to the related art includes an inlet pipe, an outlet pipe, and a drain trap. In the drain trap, water introduced through an inlet in the upper portion drops into and is stored in a storage space inside the lower portion. When water stored in the storage space (i.e., seal water) exceeds a predetermined water level, the water overflows and is discharged through an outlet formed in a peripheral portion of the drain trap. The drain trap has a seal water pipe extending from the inlet to the storage space. The inlet pipe is connected to the inlet of the drain trap such that water discharged from the drain outlet of the sanitary appliance is introduced to the drain trap through the inlet pipe, and the outlet pipe is connected to the outlet of the drain trap such that water is discharged from the drain trap through the outlet pipe.

Here, nuts are used for connecting an inlet pipe and an outlet pipe to an inlet and an outlet, respectively. Thus, in the drain guide device sanitary appliance according to the related art, when a mechanic or a worker attempts to tighten or release the nut in order to connect or disconnect the inlet pipe or the outlet pipe to or from the drain trap, the mechanic or the worker must turn the nut several times manually or with a tool, which is inconvenient. Considering that the inlet pipe or the outlet pipe is generally connected to an isolated portion of the sanitary appliance (e.g., a bottom portion or a rear portion of the sanitary appliance), this work is significantly difficult.

DISCLOSURE

Technical Problem

Accordingly, the present disclosure has been made keeping in mind the above problems occurring in the prior art, and an objective of the present disclosure is to provide a drain trap assembly for a sanitary appliance which is more advantageous in terms of workability improvement.

Technical Solution

According to embodiments of the present disclosure, provided is a drain trap assembly for a sanitary appliance, the drain trap assembly including a first pipe 10 serving as an inlet pipe, a second pipe 20 serving as an outlet pipe, and a drain trap 30 preventing odor from flowing back. The drain trap 30 has an inlet 31 provided in the upper portion in the direction of the Z axis, a storage space 32 provided inside the lower portion in the direction of the Z axis, and an outlet 33 provided in a peripheral portion. When water in the storage space 32 exceeds a predetermined water level, the water overflows and is discharged through the outlet 33, and a seal water pipe 34 extending from the inlet 31 to the storage space 32. The first pipe 10 is connected to the inlet 31 through a first joint in a one-touch manner, and the second pipe 20 is connected to the outlet 33 through a second joint in a one-touch manner. Water discharged from a sanitary appliance 1 is introduced to the drain trap 30 through the first pipe 10, and water from the drain trap 30 is discharged to a sewer pipe through the second pipe 20.

In the first pipe 10, a male thread 12 may be provided on the outer circumference of the first insertion end 11 inserted into the inlet 31. In addition, the first joint may include a nut body 100, two thread members 200, a body cover 300, and a coil spring 400. The nut body 100 may include: a base 110 having a nut hole 111 extending through the central portion in the direction of the Z axis, first and second surfaces S11, S12 provided on both sides with respect to the direction of the Z axis, the first surface S11 being located below the second surface S12, and stop surfaces 112 provided on the first surface S11 around the nut hole 111; a wall 120 provided along the peripheries of the stop surfaces 112, in the shape of a closed ring; and partitions 130 disposed on both sides of the stop surfaces 112 with respect to the direction of the X axis, respectively, wherein the partitions 130 are divided a first stop surface 112a located on one side of the stop surface 112 with respect to the direction of the Y axis and a second stop surface 112b located on the other side of the stop surface 112 with respect to the direction of the Y axis. The wall 120 may have a first tapered surface 121 on the inner circumference thereof and coupling protrusions 122 provided on outer circumferential portions thereof. The first tapered surface 121 may be configured to be expanded in the direction of the leading end of the wall 120. The coupling protrusions 122 may be provided on both sides with respect to the direction of the X axis. Each of the coupling protrusions 122 may extend in the circumferential direction of the wall 120 to reinforce both sides of the wall 120, with respect to the direction of the X axis, in the direction of the Y axis in order to prevent the wall 120 from being warped or bent by external force acting thereon in the direction of the Y axis. The two thread members 200 may be disposed on the first stop surface 112a and the second stop surface 112b, respectively. Each of the two thread members 200 has a thread 210 provided on the inner circumference to form a portion of the female thread matching the male thread 12 and a second tapered surface 221 provided on the outer circumference and matching the first tapered surface 121. The two thread members 200 may be movable in the direction of the Z axis while being movable to the center of the nut body 100 and outward from the center of the nut body 100 in the direction of the Y axis. The body cover 300 may be provided on the top portion of the body of the drain trap 30, and may be covered over the nut body 100. The body cover 300 has the inlet 31 communicating with the not hole 111 and supports 301 having support surfaces opposing the stop surfaces 112. Coupling recesses 302 may be provided on inner circumferential portions of the body cover 300 to receive the coupling protrusions 122, respectively. Both ends of the coil spring 400 may be supported on the two thread members 200 and the support surfaces to apply elastic force to the two thread members 200 in the direction of the first surface S11.

In the first joint, a sealing member 500 may be interposed between the outer circumference of the wall 120 and the inner circumference of the body cover 300. A sealing groove 125 receiving the sealing member 500 is provided on the outer circumference of the wall 120. The sealing groove 125 may be disposed on the side of the first surface S11 with respect to the position at which the coupling protrusions 122 are disposed.

In the first joint, the wall may have guide recesses 123 on the leading end thereof, the guide recesses 123 being arranged in the circumferential direction of the wall and at distances from each other. The body cover 300 may have guide stepped portions 323 on the inner circumference thereof, the guide stepped portions 323 being configured to be fitted into the guide recesses 123, respectively. Each of the guide recesses 123 may have as a first slope surface 124 reducing the size of the guide recess 123 in the direction toward the bottom of the guide recess 123. Each of the guide stepped portions 323 may have a second slope surface 324 matching the first slope surface 124.

The second pipe 20 may have a second insertion end 21 inserted into the outlet 33. A catch groove 22 may be provided on the outer circumference of the second insertion end 21. In addition, the second joint may include: a joint housing 600 provided on one side of the periphery of the drain trap 30 to have the outlet 33 and comprising a guide slot 601 extending across the outlet 33; a lock plate 700 configured to be inserted into the guide slot 601 to be movable in a penetrating direction of the guide slot 601, comprising a through-hole 711 allowing the second insertion end 21 to pass therethrough, the through-hole 711 being aligned with or misaligned from the outlet 33 depending on a moving direction, and a catch portion 712 provided on an inner circumferential portion of the through-hole 711, wherein, when the through-hole 711 is misaligned from the outlet 33, the catch portion 712 is fitted into the catch groove 22 of the second insertion end 21 inserted into the outlet 33, thereby preventing the second insertion end 21 from being separated; and an elasticity applying means 800 to apply elastic force to the lock plate 700 to move the lock plate 700 in a direction in which the through-hole 711 is misaligned from the outlet 33.

The lock plate 700 may include: a plate body 710 configured to be movably inserted into the guide slot 601 in the penetrating direction of the guide slot 601 and having the through-hole 711; and a push block 720 provided on a rear end of the plate body 710 with respect to the moving direction of the plate body 710 and configured to be pressed and manipulated. The elasticity applying means 800 may include leaf springs protruding from both edges of a rear portion of the plate body 710. The guide slot 601 may include contact stepped portions 604 configured to be in contact with the leaf springs moving forward along with the plate body 710 to induce the leaf springs to be warped when the push block 720 is pressed and manipulated.

The joint housing 600 may include a receiving recess 603 configured to communicate with the guide slot 601 and receive the push block 720.

Advantageous Effects

According to embodiments of the present disclosure, the inlet pipe (i.e., a first pipe, 10) or the outlet pipe (i.e., a second pipe, 20) are connected to the drain trap 30 by joints, respectively, in a one-touch manner. Thus, it is possible to simply and rapidly perform an operation of connecting the inlet pipe or the outlet pipe to the drain trap without using a separate tool.

According to embodiments of the present disclosure, the nut body 100 and the body cover 300 are coupled to each other by fitting the coupling protrusions 122 to the coupling recesses 322 each configured such that the bottom and the peripheral portions thereof are isolated from the outside. Thus, it is possible to fundamentally prevent water from leaking (or exiting) to the surroundings through the circumference. In addition, the sealing groove 125 receiving the sealing member 500 is disposed on the side of the first surface S11 with respect to the position of the coupling protrusions 122. This, it is also possible to reliably prevent water from leaking to the outside through the outer circumference of the wall 120 and the inner circumference of the body cover 300. In addition, the wall 120 has the shape of a closed ring, the coupling protrusions 122 disposed on outer circumferential portions of the wall and on both sides with respect to the direction of the X axis are elongated in the circumferential direction of the wall, and the two thread members 200 are disposed in the direction of the X axis. Thus, even in the case that external force is applied in the direction of the Y axis, e.g., the two thread members are moved outward from the center in the direction of the Y axis, deformation of the wall can be minimized. That is, it is possible to actively prevent the deformation of and a resultant damage in the wall by the closed ring shape of the wall and the reinforcing operation of coupling protrusions, thereby obtaining long-term usability. Furthermore, even in the case that coupling, directions of the nut body 100 and the body cover 300 are misaligned during coupling between the nut body 100 and the body cover 300, the mutual coupling directions can be corrected by the guiding operation of the guide recesses 123 having the first slope surfaces 124 and the guide stepped portions 323 having the second slope surfaces 324. Thus, a novice can simply and rapidly couple the nut body and the body cover to each other.

BEST MODE

Hereinafter, exemplary embodiments of the present disclosure will be described with reference to the accompanying drawings.

Embodiments of the present disclosure provide a drain trap assembly configured to guide water discharged through a drain outlet of a sanitary appliance, such as a washbasin, a urinal receptacle, a bath, and a sink, to a sewer pipe.

The drain trap assembly according to embodiments of the present disclosure for a sanitary appliance is illustrated in FIGS. 1 to 13.

Figure 1:
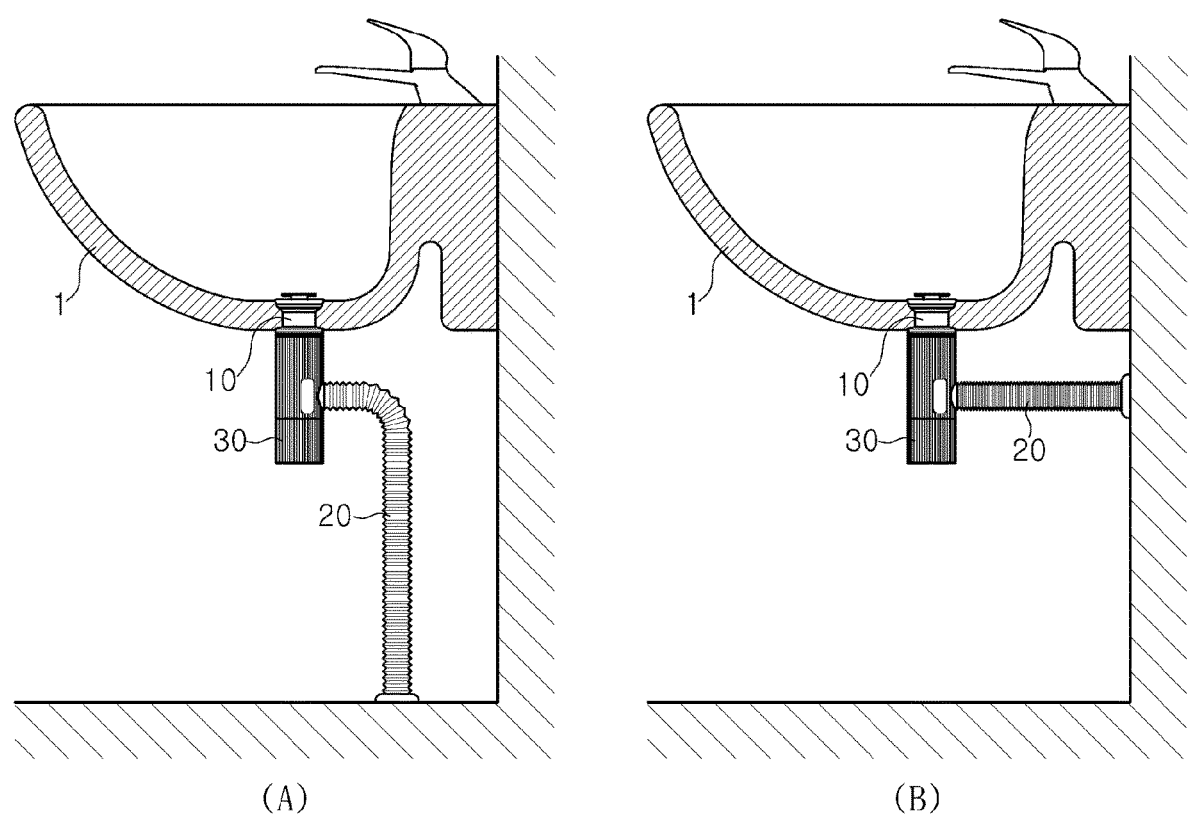
FIG. 1 illustrates applications of a drain trap assembly according to embodiments of the present disclosure.
Figure 2:
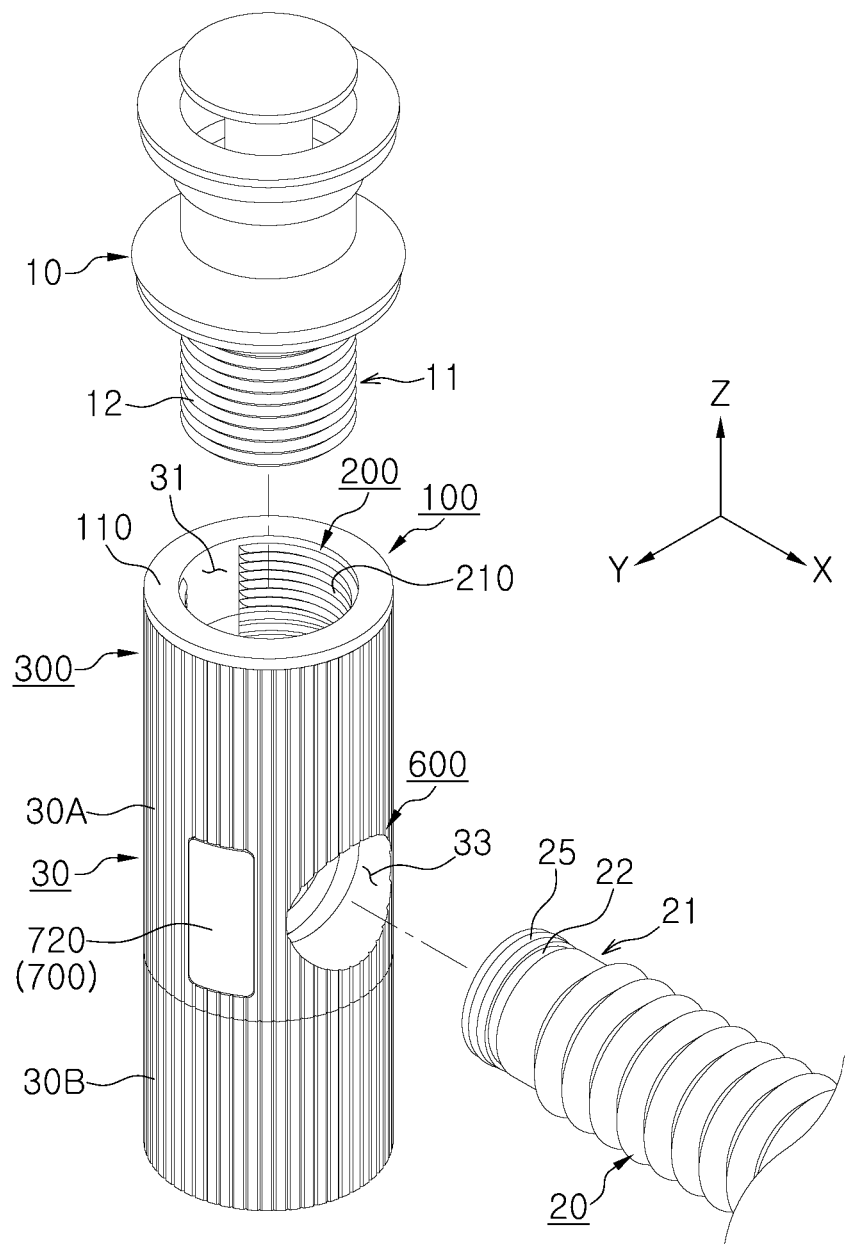
FIG. 2 is an exploded perspective view illustrating drain trap assembly according to embodiments the present disclosure.
Figure 3:
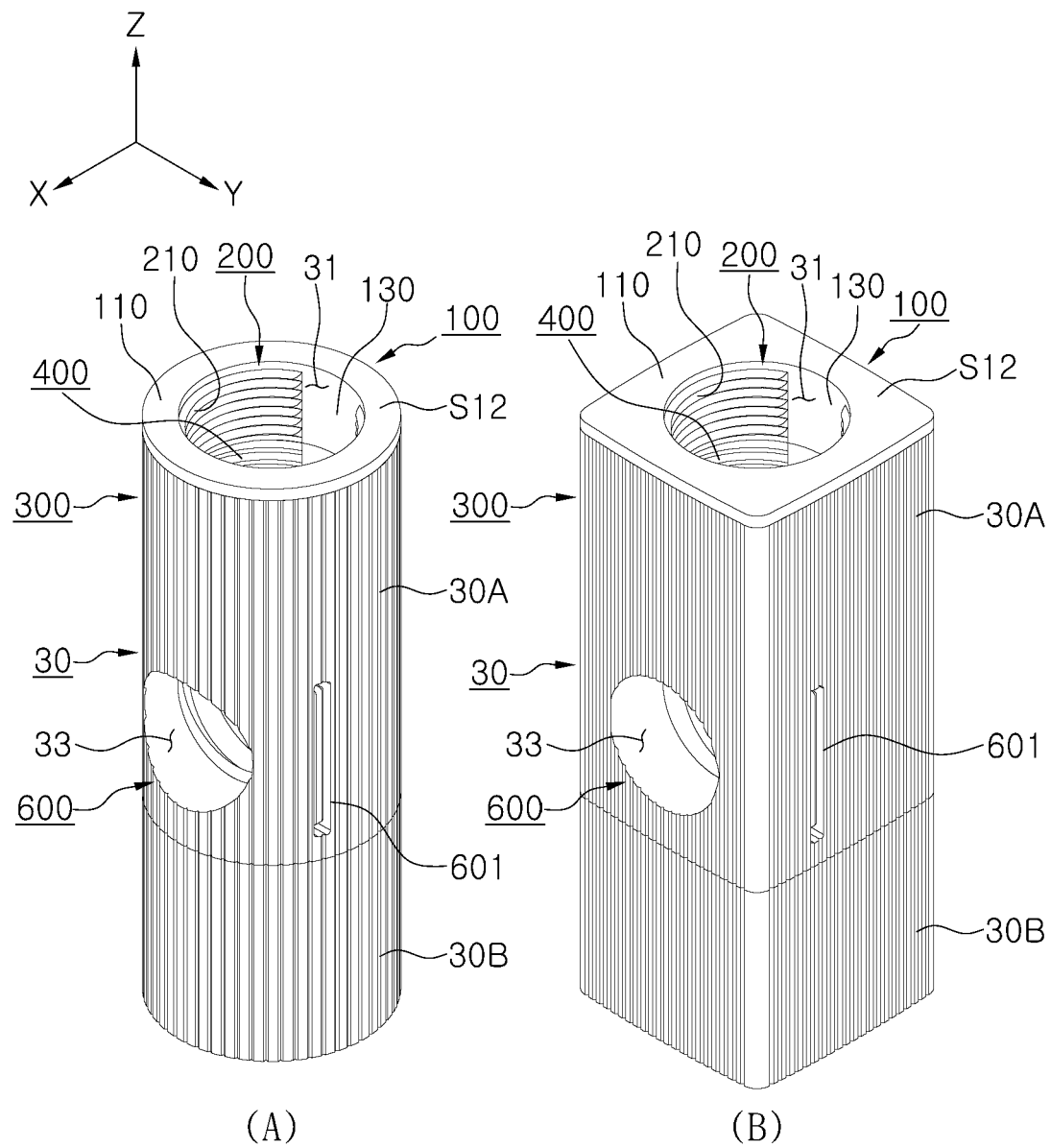
FIG. 3 is a perspective view of the drain trap illustrated in FIGS. 1 and 2, in which (A) illustrates an example of the drain trap, and (B) illustrates another example of the drain trap.

Referring to FIGS. 1 and 2 and the like, the drain trap assembly according to embodiments of the present disclosure for a sanitary appliance includes a first pipe 10 serving as an inlet pipe, a second pipe 20 serving as an outlet pipe, and a drain trap 30 preventing odor from flowing back.

Figure 4:
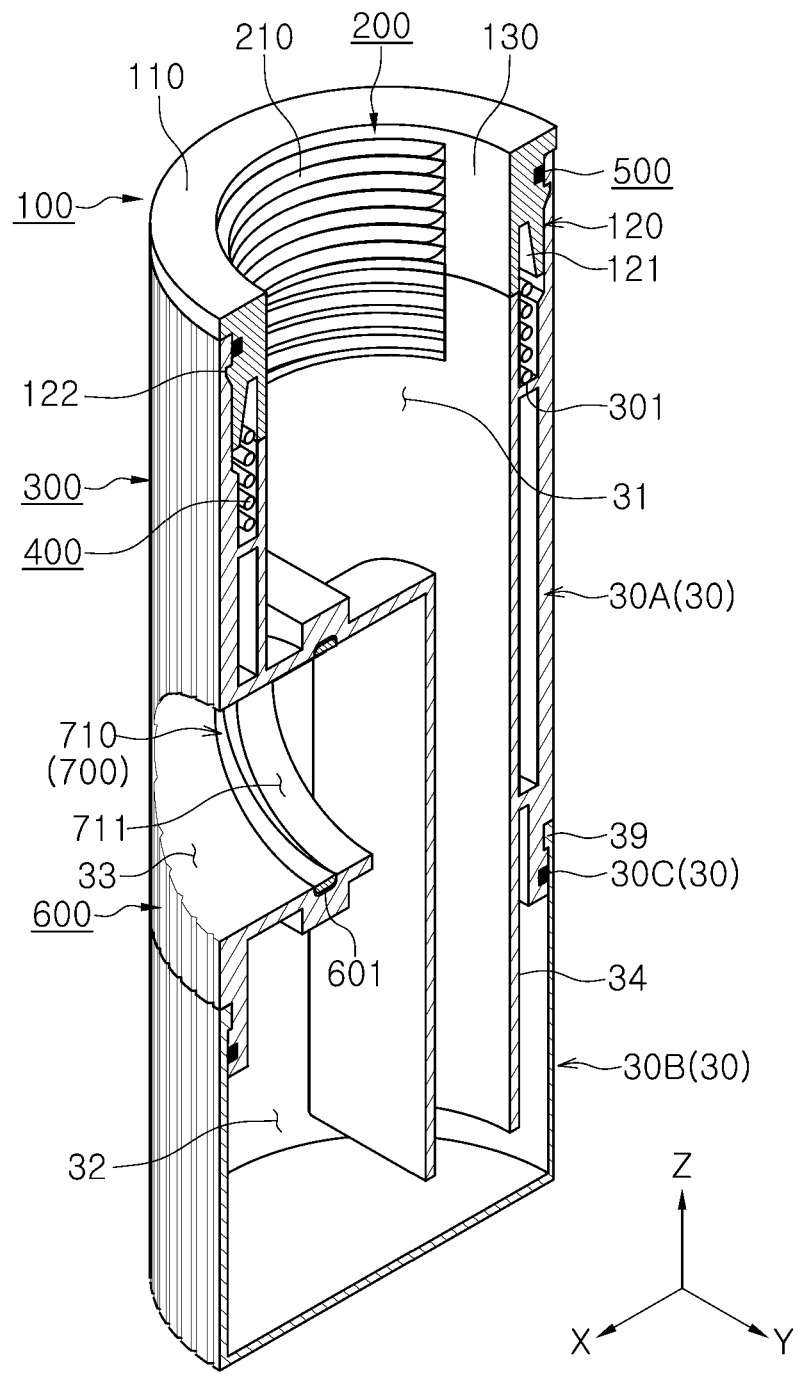
FIG. 4 is a cross-sectional perspective view of the drain trap illustrated in FIG. 3(A), viewed in the direction of the Y axis.

Referring to FIG. 4 and the like, the drain trap 30 is configured to have predetermined length in the top-bottom direction, i.e., the direction of the Z axis. The drain trap 30 has an inlet 31 formed in the upper portion, a storage space 32 formed inside the lower portion, and an outlet 33 formed in a peripheral portion. When water (i.e., seal water) in the storage space 32 exceeds a predetermined water level, the water overflows and is discharged through the outlet 33. A seal water pipe 34 extending from the inlet 31 to the storage space 32 is provided. Each of the inlet 31 and the outlet 33 may have a circular cross-sectional shape. The storage space 32 and the outlet 33 communicate with each other. The seal water pipe 34 extends downward in the direction of the Z axis to a length at which an outlet in the bottom end may be submerged in water. Consequently, this configuration prevents odor from flowing back through the inlet 31.

Figure 5:
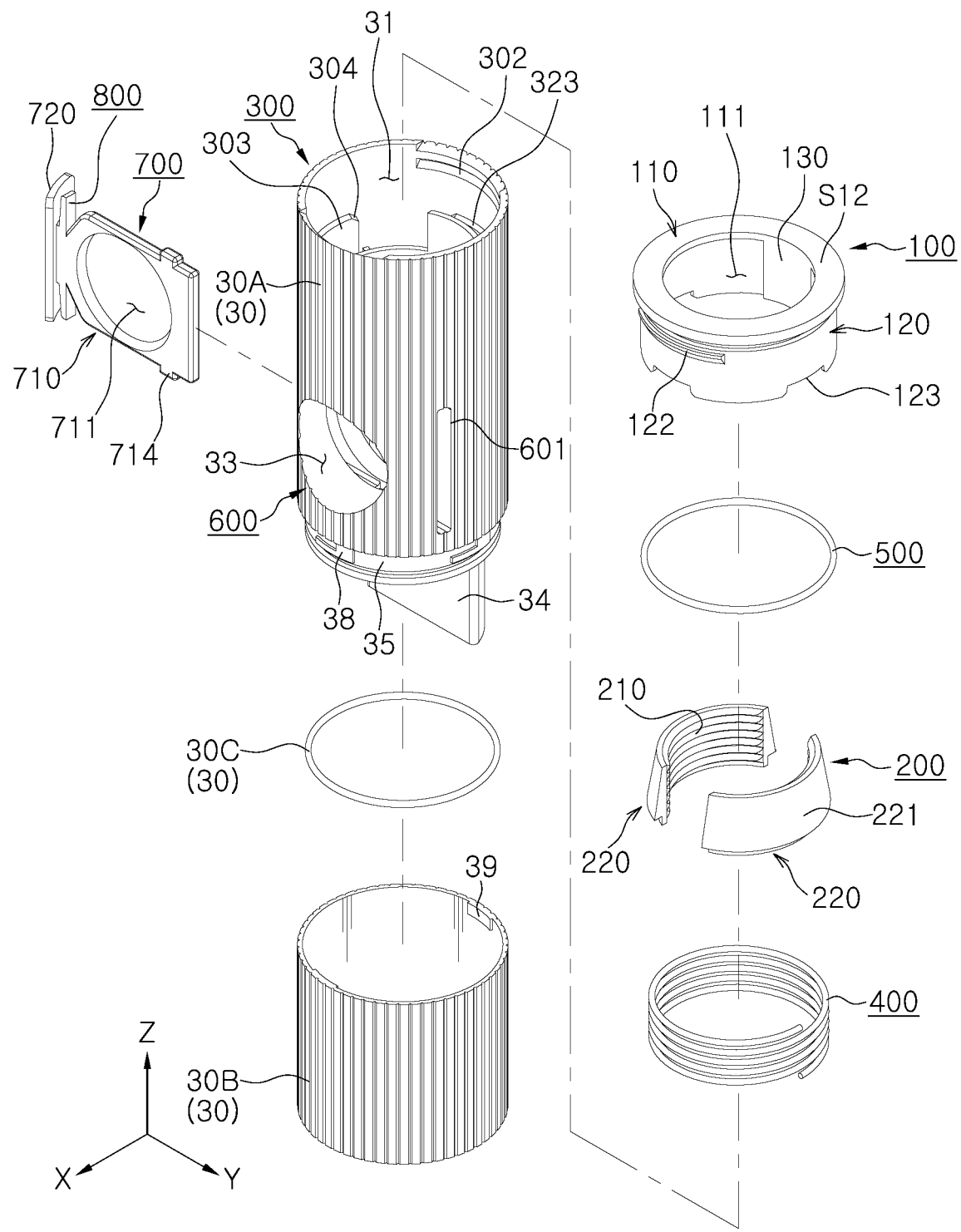
FIGS. 5 and 6 are exploded perspective views of the drain trap illustrated in FIG. 3(A), viewed in different directions.
Figure 6:
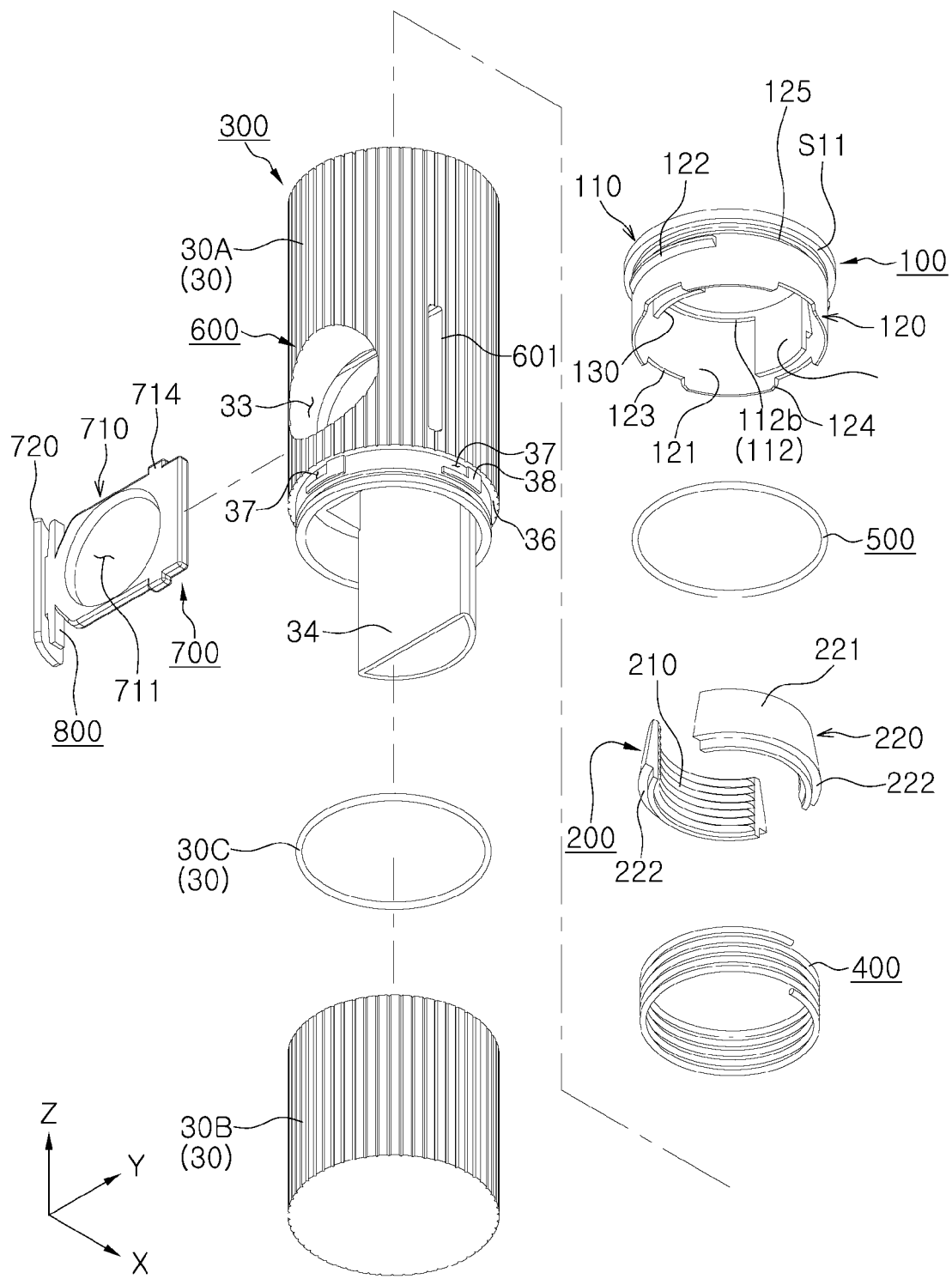
Figure 7:
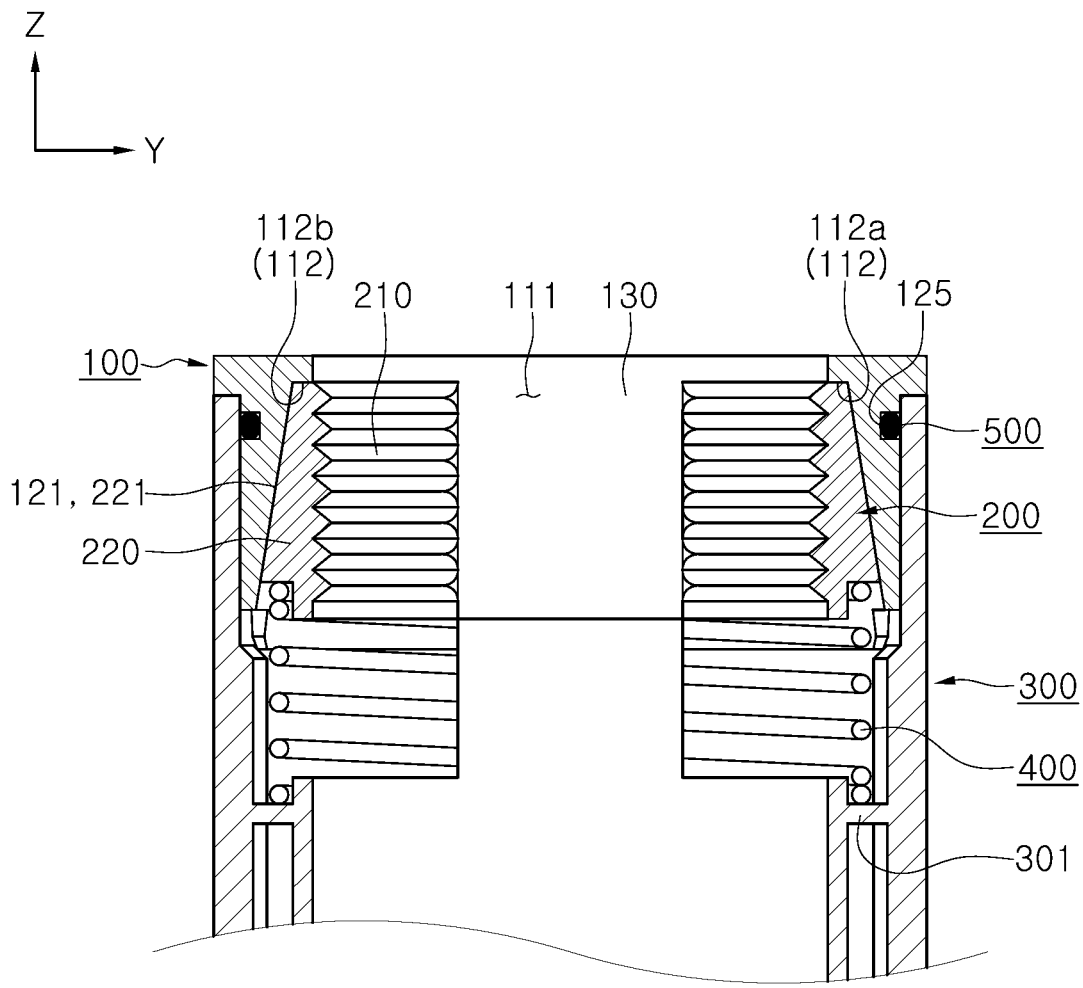
FIGS. 7 and 8 are cross-sectional views of the first joint illustrated in FIGS. 4 to 6, viewed in the direction of the X axis, in which the configuration and operation of the first joint are shown.
Figure 8:
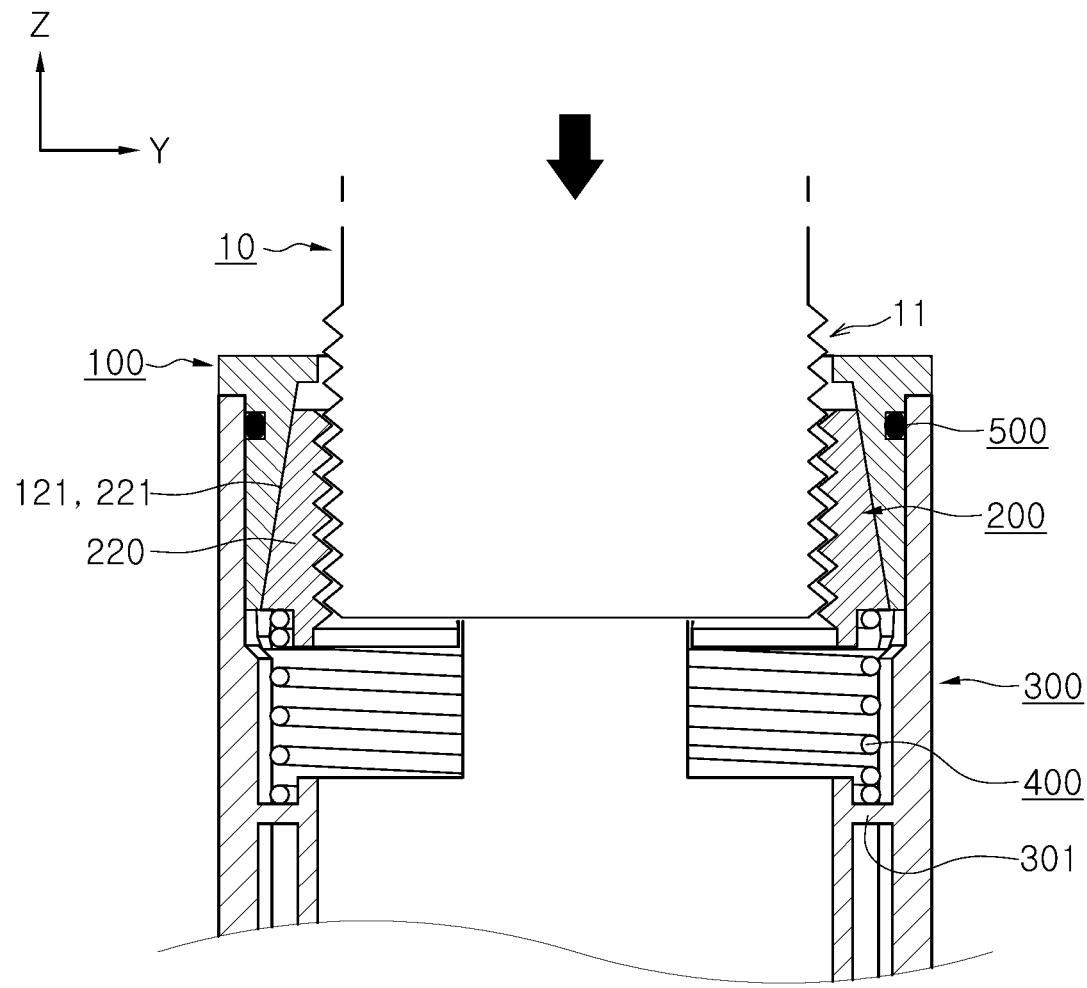
Figure 9:
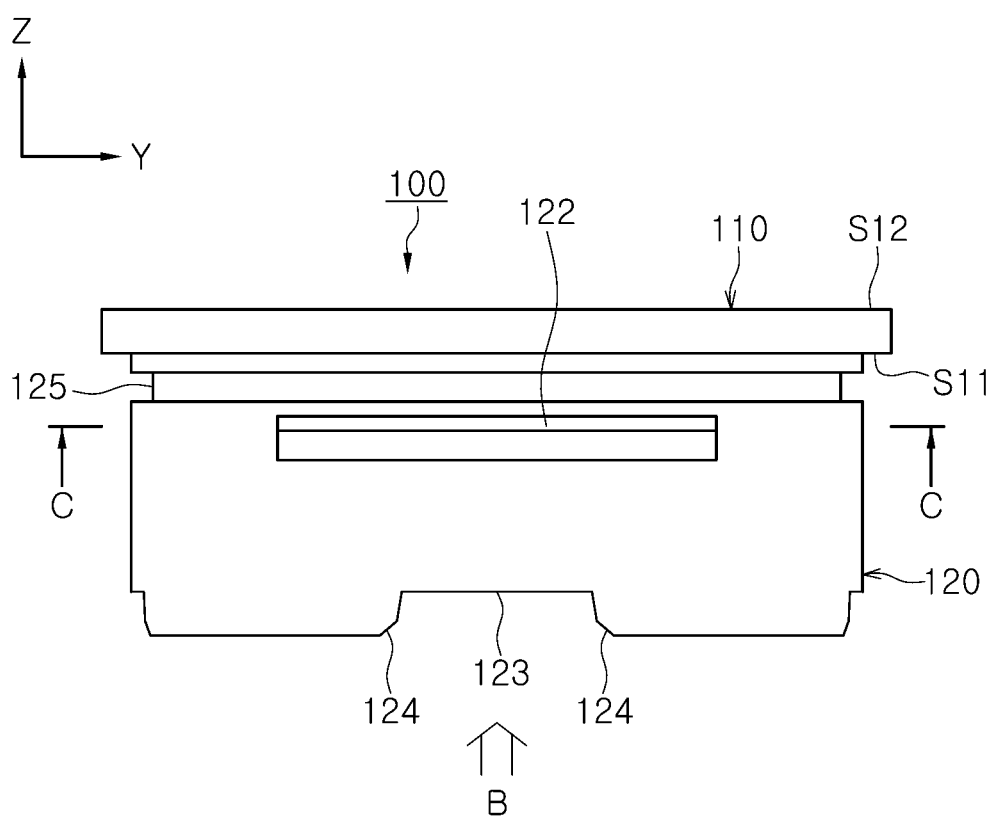
FIG. 9 is a front view of the nut body illustrated in FIGS. 7 and 8, viewed in the direction of the X axis.
Figure 10:
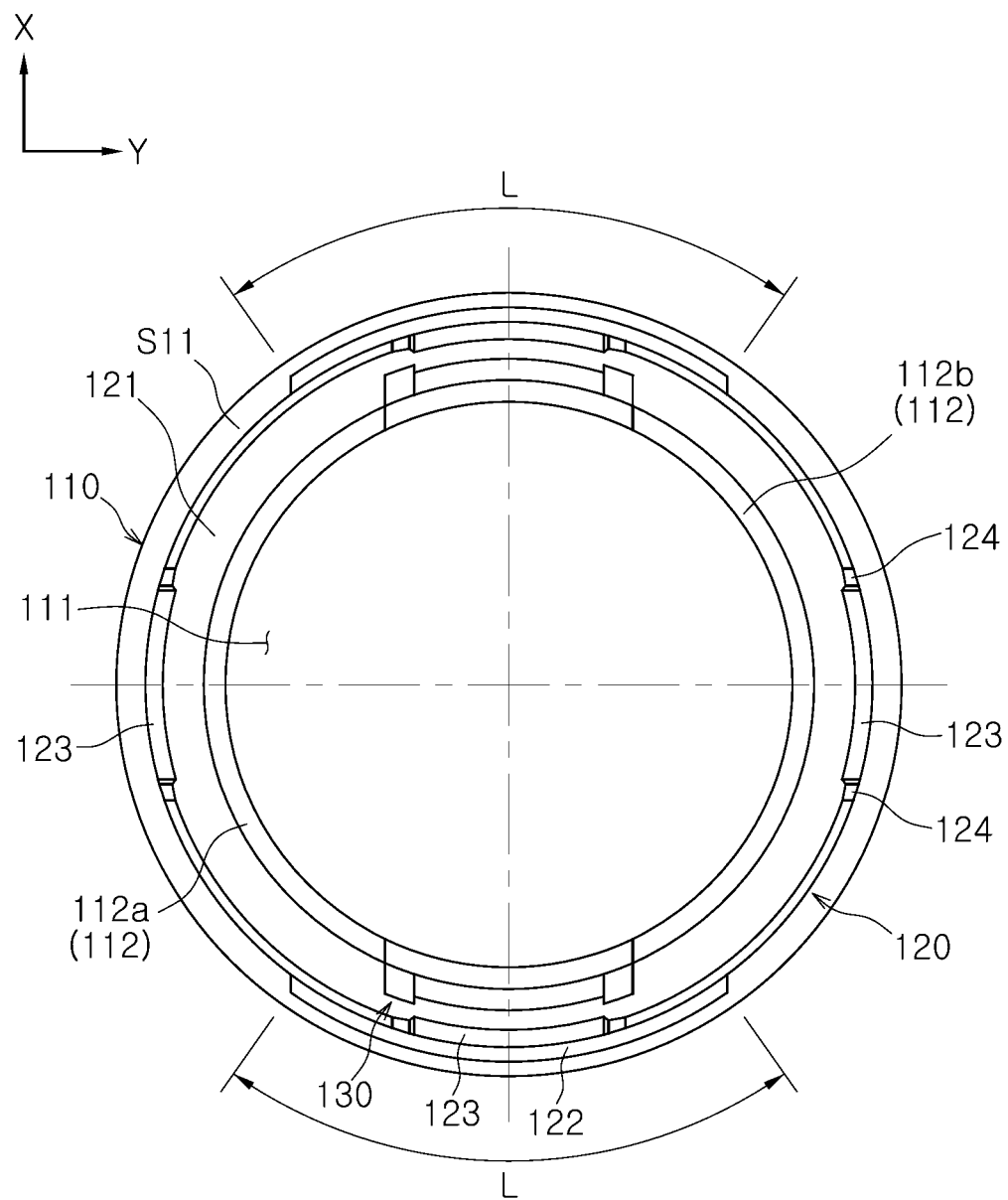
FIG. 10 is a front view of FIG. 9 viewed in B direction (i.e., the bottom view of the nut body)
Figure 11:
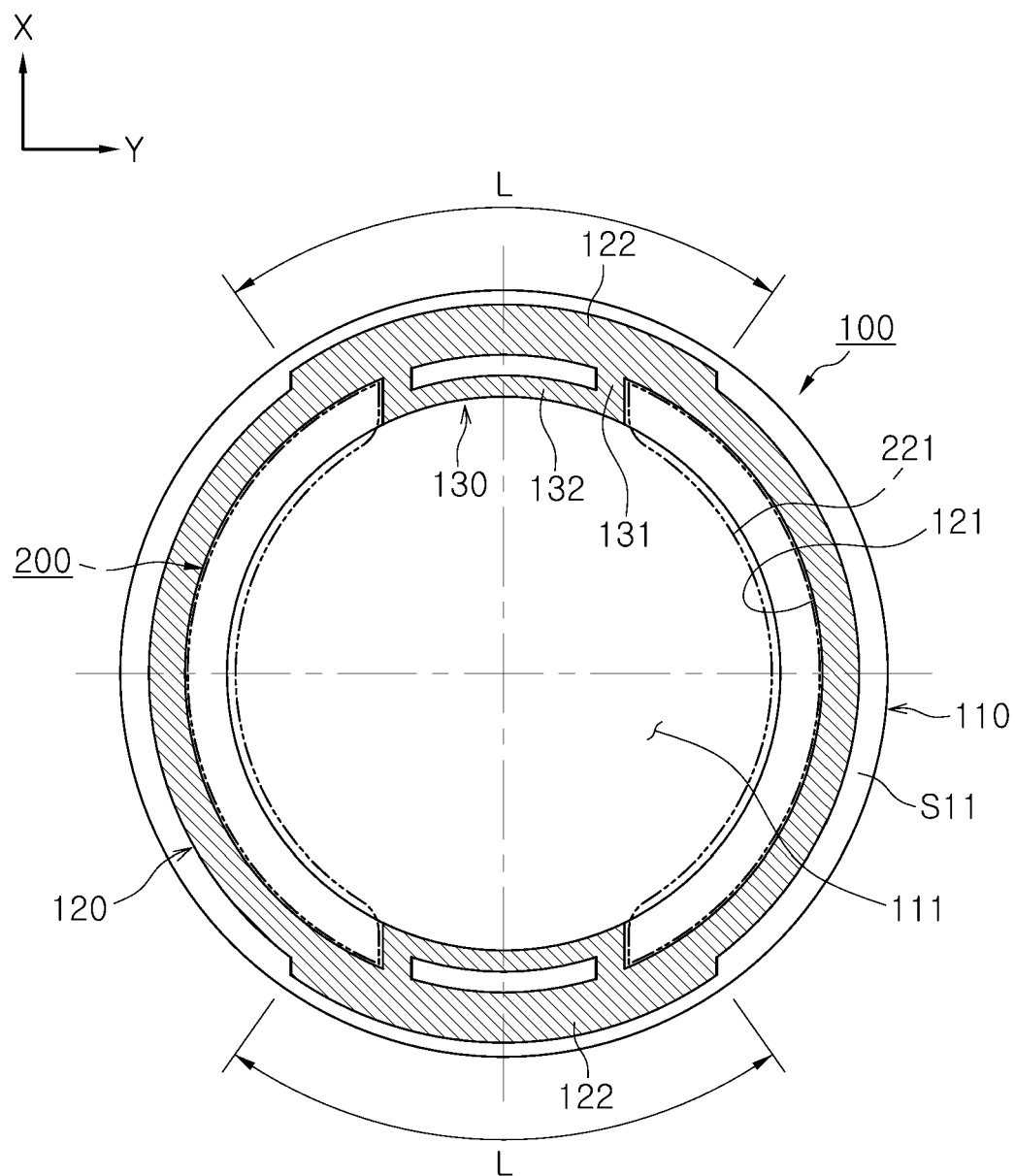
FIG. 11 is a cross-sectional view taken along line C-C in FIG. 9.

Referring to FIGS. 5 and 6 and the like, the drain trap 30 includes an upper trap body 30A and a lower cup 30B coupled to each other. The trap body 30A includes the inlet 31, the outlet 33, and the seal water pipe 34. The trap body 30A is configured such that the bottom end is open and the lower inner area forms the upper portion of the storage space 32. The cup 30B is configured such that the upper portion has an open shape. The 30B is configured such that the inner area forms the lower portion of the storage space 32. The lower inner area of trap body 30A and the inner area of the cup 30B form the storage space 32 when the trap body 30A and the cup 30B are coupled to each other.

Impurities mixed in water introduced to the storage space 32 through the inlet 31 and the seal water pipe 34 are collected in the cup 30B. Thus, when the cup 30B is separated from the trap body 30A, the impurities collected in the cup 30B may be removed.

As illustrated in FIGS. 4 to 6, the trap body 30A configured such that a coupling pipe 35 having a circular cross-section is formed integrally on the lower portion of the body, and the cup 30B is configured such that the inner circumference of the top portion corresponds to the outer circumference of the coupling pipe 35. Thus, the cup 30B is fitted around the coupling pipe 35.

The trap body 30A is configured such that the outer circumference of the coupling pipe 35 is smaller than the body, thereby forming a stepped portion between the body and the coupling pipe 35. A plurality of protrusions 38 is provided on outer circumferential portions of the coupling pipe 35 to form insertion areas 37 between a stepped portion surface 36 and the protrusions 38 such that the insertion areas 37 are spaced apart from each other at distances. The width of each of the insertion areas 37 gradually decreases in one direction along the outer circumference of the coupling pipe 35. The cup 30B has insertion protrusions 39 on inner circumferential portions of the top portion. The insertion protrusions 39 are configured to be inserted into corresponding ones of the insertion areas 37. When the cup 30B is rotated in the direction in which the width of the insertion areas 37 decreases, the insertion protrusions 39 are press-fitted into corresponding ones of the insertion areas 37.

In FIGS. 4 to 6, reference numeral 30c indicates a sealing member (e.g., an O-ring) of the drain trap 30. The sealing member 30C of the drain trap 30 interposed between the outer circumference of the coupling pipe 35 and the inner circumference of the cup 30B to perform a watertight sealing function.

The first pipe is simply connected to the inlet 31 of the drain trap 30 through a first joint in a one-touch manner, and the second pipe 20 is simply connected to the outlet 33 of the drain trap 30 through a second joint in a one-touch manner.

Referring to FIG. 2, the first pipe 10 has a first insertion end 11 inserted into the inlet 31. The first insertion end 11 is one longitudinal end of the first pipe 10. The other longitudinal end of the first pipe 10 is connected to a drain outlet of a sanitary appliance 1. Thus, water discharged through the drain outlet of the sanitary appliance 1 is introduced into the drain trap 30 through the first pipe 10. A male thread 12 is provided on the outer circumference of the first insertion end 11. As illustrated in FIG. 1, when the sanitary appliance 1 is a washbasin, the first a pipe 10 my be a pop-up valve including the first insertion end 11.

The first joint is an auto nut provided on the top portion of the drain trap 30 and having female thread configured to be coupled to the male thread 12 of the first insertion end 11. The first joint is configured such that mutual coupling between the female thread and the male thread 12 may be accomplished by rotation in the direction of the Z axis or interference fitting in the direction of the Z axis. As illustrated in FIGS. 4 to 11, the first joint includes a nut body 100, two thread members 200, a body cover 300, a coil spring (i.e., a compressed coil spring) 400, and a sealing member (i.e., an O-ring) 500.

The nut body 100 includes a base 110, a wall 120, and partitions 130.

The base 110 has a nut hole 111 extending through the central portion in the direction of the Z axis, first and second surfaces S11 and S12 provided on both sides with respect to the direction of the Z axis, the first surface S11 being located below the second surface S12, and stop surfaces 112 provided on the first surface S11 around the nut hole 111.

The wall 120 extends upright from the first surface S11 of the base 110. That is, the wall 120 protrudes from the first surface S11 in the direction of the Z axis. The wall 120 is provided along the peripheries of the stop surfaces 112, in the shape of a closed ring. The wall 120 having the shape of a closed ring may be provided as a circular wall.

A first tapered surface 121 is provided on the inner circumference of the wall 120. The first tapered surface 121 is configured such that the size of the inner circumference of the wall 120 gradually increases in the direction from the first surface S11 of the base 110 to the leading end of the wall 120.

Two coupling protrusions 122 are provided on outer circumferential portions of the wall 120. The two coupling protrusions 122 are disposed on both sides with respect to the direction of the X axis. Each of the coupling protrusions 122 extends in the circumferential direction of the wall 120 to reinforce both sides of the wall 120, with respect to the direction of the X axis, in the direction of the Y axis in order to prevent the wall 120 from being warped or bent by external force acting thereon in the direction of the Y axis. The length L of each of the coupling protrusions 122 may range from ⅓ to ⅙ with respect to the length of the outer circumference of the wall 120. The strength of the wall 120 is structurally improved due to the reinforcing action of the coupling protrusions 122.

The partitions 130 are disposed on both sides of the stop surfaces 112 of the base 110 with respect to the direction of the X axis, respectively. The partitions 130 are divided by a first stop surface 112a located on one side of the stop surface 112 with respect to the direction of the Y axis and a second stop surface 112b located on the other side of the stop surface 112 with respect to the direction of the Y axis.

The two thread members 200 are disposed on the first stop surface 112a and the second stop surface 112b, respectively. Each of the thread members 200 includes a thread 210 and a tapered plate (or taper plate) 220. Each of the threads 210 is a portion of the female thread. Each of the threads 210 is provided on the inner circumference of the corresponding tapered plate 220 to form a portion of the female thread matching the male thread 12 of the first insertion end 11.

Each of the tapered plates 220 has a second tapered surface 221 matching the first tapered surface 121. The second tapered surface 221 is provided on the outer circumference of the tapered plate 220 opposing the inner circumference of the wall 120. According to the first tapered surface 121 and the second tapered surface 221 matching each other, the thread members 200 may be moved in the direction of the Z axis and toward and outward from the center of the nut body 100 in the direction of the Y axis (see FIG. 8).

In each of the tapered plates 220, a supporting stepped portion 222 is provided on a second end disposed opposite a first end facing the corresponding stop surface 112.

In addition, each of the partitions 130 includes two side members 131 provided opposite both sides of the tapered plates 220 to restrict rotational movement of the tapered plates 220 and a connecting member 132 connecting the two side members 132. The two side members 131 may be connected to the wall 120 while connected to the base 110.

The body cover 300 is provided on the top portion of the body of the drain trap 30. The body cover 300 may be integrated with the body of the drain trap 30. The body cover 300 is covered over the nut body 100 while fitted around the wall 120.

The body cover 300 is configured to have the inlet 31 of the drain trap 30, in which the inlet 31 opposes the nut hole 111. In addition, the body cover 300 has a plurality of supports 301 having support surfaces opposing the stop surfaces 112.

Coupling recesses 302 are provided on inner circumferential portions of the body cover 300 to receive the coupling protrusions 122, respectively. When the coupling protrusions 122 are fitted into the coupling recesses 302, respectively, the nut body 100 and the body cover 300 are coupled to each other so as not to be separated.

Here, each of the coupling recesses 322 is configured such that the bottom and the peripheral portions thereof are isolated from the outside. Since the coupling protrusions 122 are fitted into the coupling recesses 322 having a recess structure, the first joint can firmly couple the nut body 100 and the body cover 300. Even in the case that water flows between the nut body 100 and the body cover 300, the first joint can fundamentally prevent the water from leaking (or exiting) to the surroundings through the peripheral portions.

The coil spring 400 applies elastic force toward the first surface S11 of the base 110 from the supports 301 of the end cover 310. The coil spring 400 applies elastic force to the two thread members 200, with one end of the coil spring 400 being supported on the supporting stepped portions 222 of the two thread members 200 and the other end of the coil spring 400 being supported on the support surfaces of the supports 301.

The sealing member 500 of the first joint is interposed between the outer circumference of the wall 120 and the inner circumference of the body cover 300 to perform a water sealing action. The wall 120 has sealing groove 125 on the outer circumference thereof extending in the circumferential direction. The sealing groove 125 receives the sealing member 500 of the first joint and prevents the sealing member 500 of the first joint from being released therefrom. The sealing groove 125 is disposed on the side of the first surface S11 with respect to the position at which the coupling protrusions 122 are disposed.

According to the water sealing operation of the sealing member 500 of the first joint, the first joint may reliably prevent a phenomenon in which water leaks outside through the outer circumference of the wall 120 and the inner circumference of the body cover 300. In addition, the leakage prevention can prevent some problems such as a user being unintentionally wet with water and the surroundings being contaminated with water.

In addition, the wall 120 has guide recesses 123 on the leading end thereof, the guide recesses 123 being arranged in the circumferential direction of the wall and at distances from each other. The body cover 300 has guide stepped portions 323 on the inner circumference thereof, the guide stepped portions 323 being configured to be fitted into the guide recesses 123, respectively. According to the guide recesses 123 and the guide stepped portions 323, when the nut body 100 and the body cover 300 are coupled to each other, the direction of the coupling may be guided so that the coupling protrusions 122 are fitted into the coupling recesses 322, respectively.

Each of the guide recesses 123 has a first slope surface 124 reducing the size of the guide recess 123 in the direction toward the bottom of the guide recess 123. Each of the guide stepped portions 323 has a second slope surface 324 matching the first slope surface 124. The first slope surface 124 and the second slope surface 324 allow the guide stepped portions 323 to smoothly enter the guide recesses 123.

Due to the guide recesses 123 having the first slope surfaces 124 and the guide stepped portions 323 having the second slope surfaces 324, the first joint allows a non-experienced mechanic or worker to simply and rapidly fit the nut body 100 and the body cover 300 to each other.

In the first joint having the above-described configuration, when the first insertion end is press-fitted onto the outer circumference of the first insertion end 11 through the nut hole 111 or the first insertion end 11 is press-fitted into the nut hole 111, the female threads of the two thread members 200 are caught by the male thread 12 of the first insertion end 11. Thus, the first tapered surface 121 and the second tapered surface 221 cause the two thread members 200 to be pushed in the direction of the Z axis by overcoming the elastic force of the coil spring 400 so as to move outward from the center in the direction of the Y axis. Afterwards, the two thread members 200 are returned by the coil spring to be screw-engaged with the male thread 12 of the first insertion end 11.

Thus, the first joint can allow the first pipe 10 to be simply and rapidly connected to the inlet 31 of the drain trap 30.

In addition, since the wall 120 has the closed ring shape, the coupling protrusions 122 disposed on both sides of the circumference of the wall 120 with respect to the direction of the X axis extend longitudinally in the circumferential direction of the wall 120, and the two thread members 200 are disposed in the direction of the Y axis, the first joint can minimize deformation of the wall 120 even in the case that strong external force is applied to the wall 120 in the direction of the Y axis, for example, the two thread members 200 are moved outward from the center in the direction of the Y axis. That is, it is possible to actively prevent the deformation of and a resultant damage in the wall 120 by the closed ring shape of the wall 120 and the reinforcing operation of coupling protrusions 122 elongated in the circumferential direction of the wall 120, thereby obtaining long-term usability.

Referring to FIG. 2, the second pipe 20 has a second insertion end 21 inserted into the outlet 33. The second insertion end 21 is one longitudinal end of the second pipe 20 and the other end of the second pipe 20 is connected to a sewer pipe. When water in the storage space 32 overflows, the water is discharged to the sewer pipe through the second pipe 20. A catch groove 22 is provided on the outer circumference of the second insertion end 21. As illustrated in FIG. 2 and the like, the second pipe 20 is a bellows pipe that bendable and adjustable in length. As illustrated in FIG. 1(A), the second pipe 20 may be connected to the sewer pipe through the floor when the sewer pipe is disposed below the floor. As illustrated in FIG. 1(B), the second pipe 20 may be connected to the sewer pipe through the wall when the sewer pipe is disposed in the wall. Accordingly, embodiments of the present disclosure provide a complex drain trap assembly.

Figure 12:
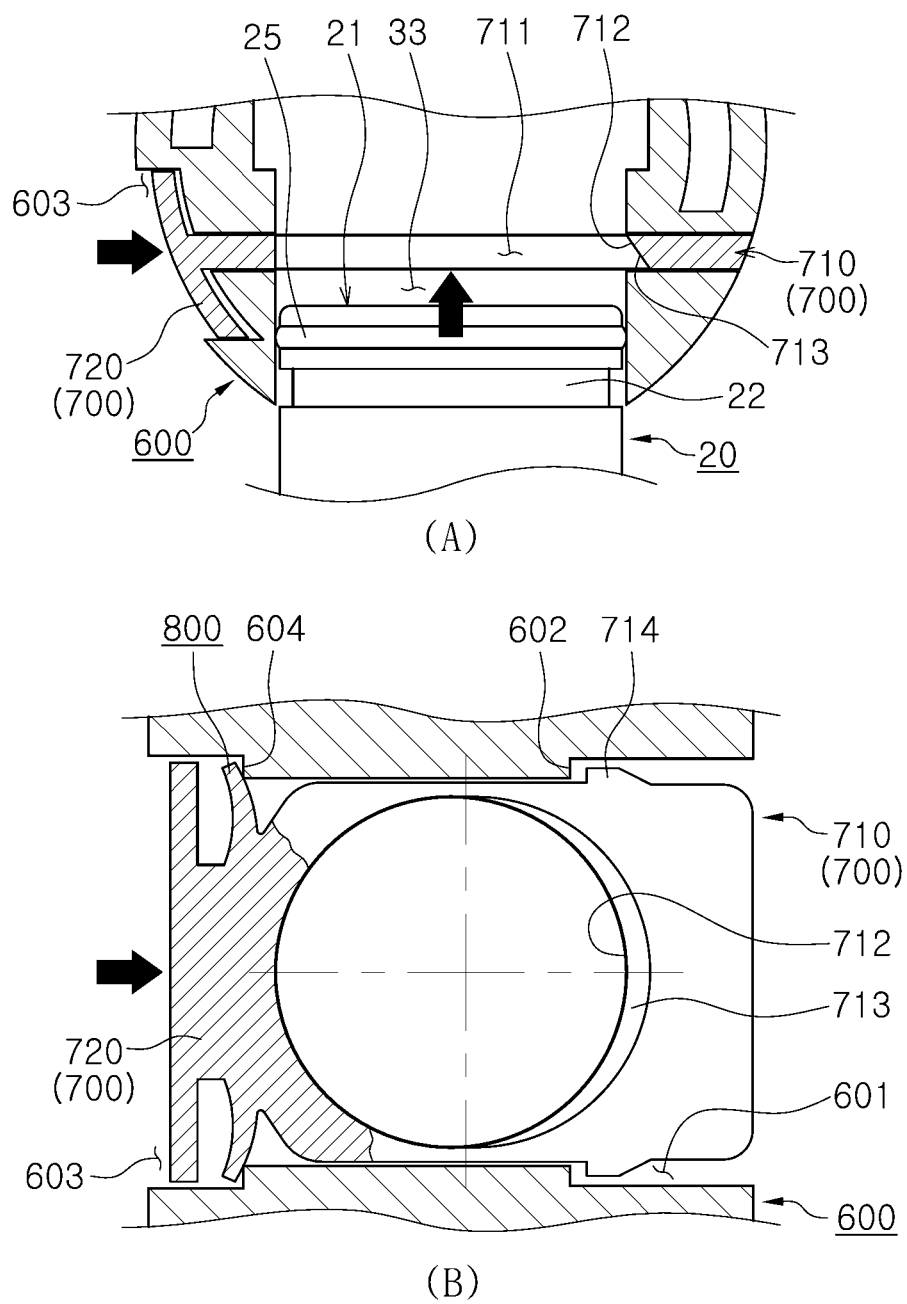
FIGS. 12 and 13 are cross-sectional views illustrating the configuration and operation of the second joint illustrated in FIGS. 5 and 6, in each of which (A) is a top cross-sectional view, and (B) is a front cross-sectional view.
Figure 13:
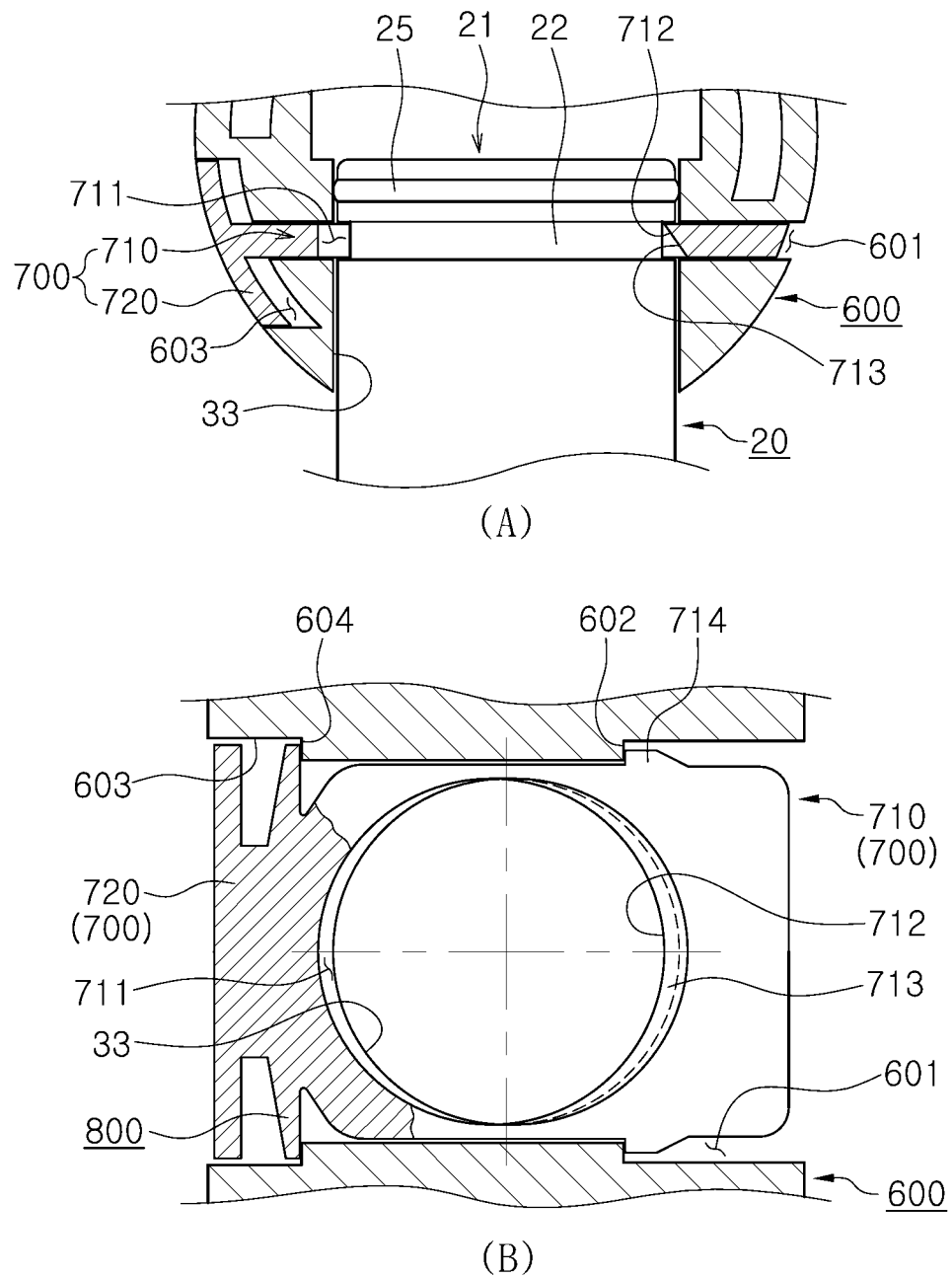

Reference numeral 25 in FIG. 2 indicates a sealing member (i.e., an O-ring) of the second pipe 20. As illustrated in FIGS. 12 and 13, when the sealing member 25 of the second pipe 20 is inserted into the outlet 33, the sealing member 25 is interposed between the second insertion end 21 and the outlet 33 to perform a water sealing operation.

Referring to FIGS. 4 to 6, 12, 13, and the like, the second joint includes a joint housing 600, a lock plate 700, and an elasticity applying means 800. The joint housing 600 is provided integrally with the body of the drain trap 30 on one side of the periphery of the drain trap 30 to have the outlet 33, and includes a guide slot 601 extending across the outlet 33. The lock plate 700 is configured to be inserted into the guide slot 601 to be movable in a penetrating direction of the guide slot 601, and has a through-hole 711 through which the second insertion end 21 may pass. The through-hole 711 is aligned with or misaligned from the outlet 33 depending on the moving direction. The lock plate 700 includes a catch portion 712 provided on an inner circumferential portion of the through-hole 711. When the through-hole 711 is misaligned from the outlet 33, the catch portion 712 is fitted into the catch groove 22 of the second insertion end 21 inserted into the outlet 33, thereby preventing the second insertion end 21 from being separated. The elasticity applying means 800 is configured to apply elastic force to the lock plate 700 to move the lock plate 700 in a direction in which the through-hole 711 is misaligned from the outlet 33.

In the second joint as described above, the through-hole 711 of the lock plate 700 remains misaligned from the outlet 33, due to the operation of the elasticity applying means 800. In this position, when the through-hole 711 is aligned with the outlet 33 by moving the lock plate 700, the second insertion enc 21 may be inserted into the outlet 33 as illustrated in FIG. 12. After the second insertion end 21 is inserted into the outlet 33, when the moving force of the lock plate 700 is removed, the elasticity applying means 800 causes the lock plate 700 to move in a direction in which the through-hole 711 is misaligned from the outlet 33, and as illustrated in FIG. 13, the catch portion 712 is fitted into the catch groove 22 of the second insertion end 21. Here, even in the case that the second pipe 20 is pulled, the second insertion end 21 is prevented from being separated by the catching operation of the catch groove 22 and the catch portion 712. When the second pipe 20 is pulled in a position in which the through-hole 711 is aligned with the outlet 33, the second insertion end 21 is separated from the outlet 33.

The lock plate 700 includes: a plate body 710 configured to be movably inserted into the guide slot 601 in the penetrating direction of the guide slot 601 and having the through-hole 711; and a push block 720 provided on the rear end of the plate body 710 with respect to the moving direction of the plate body 710 and configured to be pressed and manipulated by the mechanic.

The through-hole 711 is provided as a slope surface 713 configured to be in contact with the leading end of the second insertion end 21, a portion or the entirety of the inner circumference of which is inserted into the outlet 33. The slope surface 713 of the through-hole 711 is configured such that the size of the through-hole 711 decreases in the insertion direction of the second insertion end 21. Thus, when the second insertion end 21 inserted into the outlet 33 is in contact with the slope surface 713 to press the slope surface 713, the lock plate 700 may move in the direction in which the through-hole 711 is aligned with the outlet 33.

Stop protrusions 714 are provided on both edges of the front portion of the plate body 710. The guide slot 601 has stopping stepped portions 602 configured to be in contact with the stop protrusions 714, respectively, to restrict backward movement of the lock plate 700 when the through-hole 711 is misaligned from the outlet 33 in response to the lock plate 700 being moved backward the elasticity applying means 800.

The joint housing 600 has a receiving recess 603 configured to communicate with the guide slot 601 and receive the push block 720. The elasticity applying means 800 includes leaf springs protruding from both edges of the rear portion of the plate body 710. The guide slot 601 has contact stepped portions 604 configured to be in contact with the leaf springs moving forward along with the plate body 710 to induce the leaf springs to be warped when the push block 720 is pressed and manipulated by the mechanic.

In addition, the push block 720 may be configured to be coplanar with the outer portion of the joint housing 600 when the push block 720 is moved backward k the elasticity applying means 800.

According to the slope surface 713, the stopping stepped portions 602, the stop protrusions 714, the leaf springs, and contact stepped portions 604, when the second pipe 20 is connected to the outlet 33 of the drain trap 30, the mechanic completes the connection of the second pipe 20 by inserting the second insertion end 21 into the outlet without having to separately pressing the push block 720.

The invention claimed is:

1. A drain trap assembly for a sanitary appliance, the drain trap assembly comprising:
   a drain trap (30) comprising an inlet (31) provided in an upper portion of the drain trap and configured to allow water discharged from a sanitary appliance (1) to enter therethrough, a storage space (32) provided inside a lower portion of the drain trap, an outlet (33) provided in a peripheral portion of the drain trap and configured to allow water in the storage space (32) to be discharged therethrough when the water exceeds a predetermined water level, and a seal water pipe 34 extending from the inlet (31) to the storage space (32); and an outlet pipe (20) connected to the outlet (33) through a joint and configured to allow water from the drain trap (30) to be discharged to a sewer pipe therethrough, wherein the outlet pipe (20) comprises a catch groove (22) provided on an outer circumferential portion of a insertion end (21) inserted, into the outlet (33), and the joint comprises:

a joint housing (600) provided on one side of the periphery of the drain trap (30) to have the outlet (33) and comprising a guide slot (601) extending across the outlet (33);

a lock plate (700) configured to be inserted into the guide slot (601) to be movable in a penetrating direction of the guide slot (601), comprising a through-hole (711) allowing the insertion end (21) to pass therethrough, the through-hole (711) being aligned with or misaligned from the outlet (33) depending on a moving direction, and a catch portion (712) provided on an inner circumferential portion of the through-hole (711), wherein, when the through-hole (711) is misaligned from the outlet (33), the catch portion (712) is fitted into the catch groove (22) of the insertion end (21) inserted into the outlet (33), thereby preventing the insertion end (21) from being separated; and an elasticity applying means (800) to apply elastic force to the lock plate (700) to move the lock plate (700) in a direction in which the through-hole (711) is misaligned from the outlet (33).

2. The drain trap assembly according to claim 1, wherein the lock plate (700)) comprises:

a plate body (710) configured to be movably inserted into the guide slot (601) in the penetrating direction of the guide slot (601) and having the through-hole (711); and a push block (720) provided on a rear end the plate body (710) with respect to the moving direction of the plate body (710) and configured to be pressed and manipulated, wherein the elasticity applying means (800) comprises leaf springs protruding from both edges of a rear portion of the plate body (710), and wherein the guide slot (601) comprises contact stepped portions (604) configured to be in contact with the leaf springs moving forward along with the plate body (710) to induce the leaf springs to be warped when the push block (720) is pressed and manipulated.

3. The drain trap assembly according to claim 2, wherein the joint housing (600) comprises a receiving recess (603) configured to communicate with the guide slot (601) and receive the push block (720).

* * * * *